United States Patent Office 3,036,979
Patented May 29, 1962

3,036,979
POLYESTER-URETHANE, PROCESS OF MAKING SOLUTION OF SAME, AND PRODUCTS THEREFROM
Emerson La Verne Wittbecker, West Chester, Pa., assignor to E. I. du Pont de Nemours and Company, Wilmington, Del., a corporation of Delaware
No Drawing. Filed Apr. 28, 1958, Ser. No. 731,114
8 Claims. (Cl. 260—31.2)

This invention relates to new fiber-forming synthetic polymers and to fibers derived therefrom.

Well-known commercially ssuccessful synthetic fibers possess a wide variety of desirable physical and chemical properties, but new and improved polymers with additional advantages are still desired. For example, polyamide and polyester fibers have high tenacity resistance to water and excellent abrasion resistance but are also quite resistant to dyeing by procedures normally practiced with natural textile fibers. This decreased dye receptivity has made it necessary to develop new and somewhat more elaborate dyeing processes to permit these fibers to be employed to their fullest extent in textile apparels.

An alternate solution to the problem of providing dye-receptive synthetic fibers having outstanding physical and chemical properties has been the production of synthetic fibers having improved dye receptivity. U.S. 2,731,446 described polyurethanes suitable for the preparation of synthetic fibers which exhibit a higher degree of dye receptivity, but it would be even more advantageous if such improved dye receptivity were exhibited by a fiber which combined this behavior with the same low degree of water absorption which is exhibited by polyesters and polyamide. To be commercially successful, of course, such a synthetic fiber must have high tenacity and other good physical properties such as high melting point, freedom from discoloration, and dimensional stability.

It is an object of this invention to provide a novel condensation polymer suitable for the formation of synthetic textile fibers with improved dyeability and desirable physical properties.

According to this invention there is provided a novel polymeric composition with a structural formula characterized by the repeating unit:

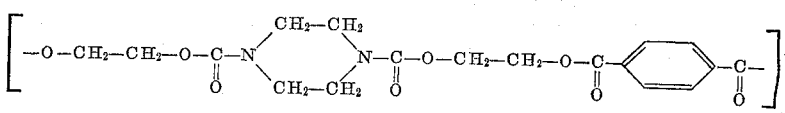

where $n$ is at least about 20, prereraoiy oetween 20 and about 125. This polymer has outstanding dyeability with both acid and dispersed dyes, and is soluble in inexpensive volatile organic solvents suitable for the preparation of fibers by dry or wet spinning techniques. Water absorption values of the polymer, based on the initial polymer weight, are in the range of from about 0.5 to about 8% at 95% relative humidity, and its melting point is about 215° C. The polymer has an inherent viscosity of at least about 0.6 and is readily crystallizable.

Suitable copolymers of this novel polymeric composition include the copolymer containing between about 10 and about 50 mole percent of the polyurethane shown in U.S. Patent 2,731,446 to Wittbecker, obtained as the reaction product of ethylene glycol bischloroformate and piperazine.

The novel polymeric composition of this invention is preferably produced, for example, by reacting equimolar proportions of piperazine and the bischloroformate of bis(2-hydroxyethyl) terephthalate at from about −10° C. to about 100° C., preferably from about 10 to about 30° C., in a two-phase interfacial polymerization system.

Fibers and films may be produced from solutions of the resulting novel composition in such solvents as mixtures of trichloroethane and formic acid in ratios from about 75:25 to about 95:5, preferably 90:10; chloroform and methanol, preferably in the azeotropic ratio of 88:12; low-boiling halogenated hydrocarbons, formic acid and methanol; and also meta-cresol. Suitable low-boiling halogenated hydrocarbons include trichloroethane, methylene chloride, chloroform and 1,2-dichloroethane. Fibers produced from this composition have the same good dye receptivity and insensitivity to water when made into fabrics, as well as physical properties which permit the development of fabrics with good abrasion resistance, strength, and durability during wearing.

Preparation of the polymer and fibers of this invention is illustrated in the following example. Parts and percentages are by weight unless otherwise indicated.

All values of inherent viscosity in the specification and claims are calculated from the equation:

$$\text{Inherent viscosity} = \frac{\ln R}{C}$$

wherein R is the viscosity of a solution of 0.5 gram of the polymer in 100 milliliters of meta-cresol at 30° C. divided by the viscosity of meta-cresol in the same units and at the same temperature, and C is the concentration of the polymer solution in grams of polymer per 100 milliliters of solution.

*Example I*

A round-bottomed flask is charged with 600 parts of dimethyl terephthalate, 3900 parts of ethylene glycol, and 1 part of calcium acetate monohydrate as a catalyst. From this reaction mixture, methanol is removed by distillation during which time there is formed bis(2-hydroxyethyl) terephthalate. Distillation is stopped when the head temperature of the column rises to 150° C. The mixture is cooled to room temperature, poured into 8000 parts of distilled water and filtered. The white solid impure product obtained in this manner is purified by reprecipitation from boiling water. Crystalline material with a melting point of 105° C. to 107° C., in an amount of 429 parts, is obtained. A portion of this ester is dissolved in dry dioxane and transformed into the bischloroformate by treatment with a dioxane solution of phosgene at reduced temperature, in accordance with procedure shown in U.S. Patent 2,787,630. The resulting product is the bischloroformate of bis(2-hydroxyethyl) terephthalate.

The polymer of this invention is prepared by reacting this product with piperazine in the following manner: A Waring Blendor jar is charged with 210 parts of distilled water, 15 parts of a 5% solution of a synthetic wetting agent, 34 parts of benzene, 6.36 parts of sodium carbonate, and 3.1 parts of piperazine dissolved in 30 parts of water. To this rapidly stirred mixture is added a solution of 11.37 parts of the ester bischloroformate in 34 parts of benzene. The stirring is continued for 20 minutes while the reaction temperature remains at approximately 25° C. At the end of 20 minutes the agitation is stopped, and the polymer emulsion is broken with acetone. The polymer is collected on a filter, washed several times with distilled water and dried overnight in a vacuum oven at 70° C. The resulting polymer in an amount of 10.6 parts is obtained, representing an 85% yield. The polymer has an inherent viscosity of 1.26.

Polymer obtained as described above is dissolved in a 90/10 percentage composition mixture of trichloroethane and formic acid to give a solution containing about 25% solids. This solution is spun through a spinneret into a conventional dry spinning air cell and the resulting fibers are wound up continuously. Spinning performance is excellent, and there is no difficulty in maintaining a continuous threadline. The resulting yarn is drawn 5.7 times its original length over a hot pin at 142° C. This drawn yarn has a tenacity of 4.5 grams per denier, an elongation at the break of 17%, and an initial modulus of 72 grams per denier. The fiber stick temperature of this yarn is 185° C., while the polymer melt temperature of the bulk polymer is 215° C. The "stick temperature" is the temperature at which two fibers of the same composition will adhere one to the other upon gradual heating to that temperature. The polymer has a water absorption of 3.5%. Glass-clear films were also cast from this solution.

The yarn is tested for dyeability with an acid dye (Orange II, Colour Index 11510) and a dispersed dye (Acetamine Scarlet B, Colour Index 11110). In both cases, on the basis of comparative experiments, deeper shades are obtained with the alternating copolymer fibers than with a homopolymeric yarn sample of the polyurethane prepared from piperazine and ethylene bischloroformate. When the dyeability of the copolymer yarn of this example is compared with that of poly(ethylene terephthalate), it is found that the copolymer is greatly superior in dye receptivity to the polyester. The water absorptivity of the fibers of this invention is equivalent to that of highly water-insensitive poly(ethylene terephthalate) fibers and much lower than homopolymeric polyurethane fibers.

The polymeric compositions of the present invention have good solubility in the above-disclosed solvents, permitting fibers to be formed using wet or dry spinning procedures as in the case of polyurethanes, while at the same time having a water absorption value equivalent to polyesters, such as poly(ethylene terephthalate). In addition, however, the present polymeric composition in certain respects is superior to polyurethanes and polyesters, particularly in regard to dye receptivity.

The claimed invention:

1. A novel polymeric composition having a structural formula with the repeating unit:

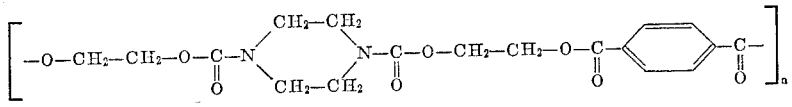

where $n$ is at least about 20, the said composition having an inherent viscosity of at least about 0.6 based on the viscosity of a solution of 0.5 gram of the said composition in 100 ml. of meta-cresol at 30° C.

2. The polymeric composition of claim 1 wherein the value of $n$ is from about 20 to about 125.

3. A fiber comprising the polymeric composition of claim 1.

4. The fiber of claim 3 having a water absorption value, based on the initial polymer weight, in the range of from about 0.5% to about 8% at 95% relative humidity.

5. A novel composition of matter comprising a solution of a polymeric composition having a structural formula with the repeating unit:

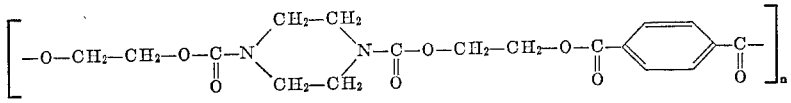

where $n$ is at least about 20, the said composition having an inherent viscosity of at least about 0.6 based on the viscosity of a solution of 0.5 gram of the said composition in 100 ml. of meta-cresol at 30° C. in a solvent selected from the group consisting of (1) a mixture of trichloroethane and formic acid in ratios of from about 75:25 to about 95:5, respectively, (2) a mixture of chloroform and methanol, (3) a mixture of halogenated hydrocarbons containing at least one carbon atom having both a hydrogen and halogen atom attached thereto, and containing at least as many halogen atoms as carbon atoms, formic acid and methanol, and (4) meta-cresol.

6. The novel composition of claim 5, wherein the solvent comprises a 90/10 percentage composition mixture of trichloroethane and formic acid, respectively.

7. The process comprising reacting, at a temperature between about −10° C. and about 100° C., piperazine and the bischloroformate of bis(2-hydroxyethyl) terephthalate, the said reactants being liquid and mutually immiscible and at least one of the said reactants being in solution, to produce a polymeric composition having a structural formula with the repeating unit:

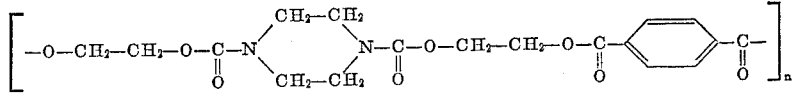

where $n$ is at least about 20, the said composition having an inherent viscosity of at least about 0.6 based on the viscosity of a solution of 0.5 gram of the said composition in 100 ml. of meta-cresol at 30° C.

8. A film comprising the polymeric composition of claim 1.

References Cited in the file of this patent

UNITED STATES PATENTS

| | | |
|---|---|---|
| 2,877,212 | Seligman | Mar. 10, 1959 |
| 2,962,470 | Jung | Nov. 29, 1960 |

FOREIGN PATENTS

| | | |
|---|---|---|
| 1,123,599 | France | Sept. 24, 1956 |